(12) United States Patent
Weizman et al.

(10) Patent No.: US 9,774,985 B2
(45) Date of Patent: Sep. 26, 2017

(54) BROADCAST AGING FOR BLUETOOTH LOW ENERGY

(71) Applicant: Intel IP Corporation, Santa Clara, CA (US)

(72) Inventors: Raz Weizman, Beer Sheva (IL); Eddy Kvetny, Rishon-Lezion (IL)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/668,691

(22) Filed: Mar. 25, 2015

(65) Prior Publication Data

US 2016/0286339 A1   Sep. 29, 2016

(51) Int. Cl.
| | |
|---|---|
| H04B 5/00 | (2006.01) |
| H04B 7/00 | (2006.01) |
| H04W 4/00 | (2009.01) |
| H04W 4/06 | (2009.01) |
| H04W 40/24 | (2009.01) |
| H04W 72/04 | (2009.01) |
| H04W 52/02 | (2009.01) |

(52) U.S. Cl.
CPC ............ *H04W 4/008* (2013.01); *H04W 4/06* (2013.01); *H04W 40/244* (2013.01); *H04W 52/0258* (2013.01); *H04W 72/0446* (2013.01); *Y02B 60/50* (2013.01)

(58) Field of Classification Search
CPC ...................................................... H04W 4/008
USPC .................................... 455/41.1, 41.2, 507
See application file for complete search history.

(56) References Cited

U.S. PATENT DOCUMENTS

| | | | | |
|---|---|---|---|---|
| 9,100,799 | B1* | 8/2015 | Thiagarajan | H04W 4/06 |
| 2004/0203567 | A1* | 10/2004 | Berger | G08B 25/016 |
| | | | | 455/404.1 |
| 2006/0187873 | A1* | 8/2006 | Friday | H04W 48/20 |
| | | | | 370/328 |
| 2009/0088183 | A1* | 4/2009 | Piersol | G01C 21/206 |
| | | | | 455/456.1 |
| 2014/0293992 | A1* | 10/2014 | Abraham | H04W 52/0225 |
| | | | | 370/350 |
| 2015/0140982 | A1* | 5/2015 | Postrel | H04W 4/008 |
| | | | | 455/418 |
| 2016/0094940 | A1* | 3/2016 | Vigier | H04W 4/02 |
| | | | | 455/456.3 |

OTHER PUBLICATIONS

International Search Report and Written Opinion received for PCT Patent Application No. PCT/US2016/024108, mailed Jun. 17, 2016, 12 pages.

* cited by examiner

*Primary Examiner* — Tilahun B Gesesse

(57) ABSTRACT

Disclosed herein are techniques to age filter information for a wireless network. In particular, a device to remove indications to filter beacons broadcast from another device based on the difference between a time a beacon was last received from the other device is disclosed. The device may be configured to update a filter information element each time a beacon is received from the other device and also to update an indication to filter beacons from the device based on the filter information element.

22 Claims, 11 Drawing Sheets

Duplication Filter Table 300

| Filter Information Element 312-1 | Filter Information Element 312-2 | ... | Filter Information Element 312-N |
|---|---|---|---|
| Device Indication 322-1 \| Time Stamp Indication 324-1 | Device Indication 322-2 \| Time Stamp Indication 324-2 | | Device Indication 322-N \| Time Stamp Indication 324-N |

*FIG. 3*

BROADCAST AGING FOR BLUETOOTH LOW ENERGY

TECHNICAL FIELD

Embodiments described herein generally relate to wireless communications and in particular to aging Bluetooth Low Energy broadcasts.

BACKGROUND

Many modern devices include networking capabilities. In particular, many devices include various communication and networking abilities. Modern applications are beginning to take advantage of this and provide for interconnectivity of such devices. For example, social networking applications, Internet of Things, wireless docking, etc. may provide for the interconnectivity of various devices. A variety of standards are used or proposed to facilitate such device connectivity. For example, Bluetooth Low Energy (BLE).

BLE may provide reduced power consumption (e.g., versus standard Bluetooth, or the like). Additionally, as BLE has relatively simple hardware requirements, BLE may provide a lower cost while maintaining a similar communication range to standard Bluetooth. An area where BLE is being implemented is using beacon broadcasting to facilitate communication between devices, for example, in the healthcare, fitness, entertainment, and security industries. BLE beacon broadcasting allows devices to advertise connectivity and service information to other devices within a certain vicinity.

In general, devices advertise their connectivity and/or services by repeatedly broadcasting a beacon via a BLE radio. Other devices in range may receive the beacon via their BLE radio. Where multiple BLE devices are in proximity to each other, the number of beacons being transmitted over BLE can become large enough some devices may be have their hardware (e.g., host processing, memory, or the like) over utilized by the beacons.

BRIEF DESCRIPTION OF THE DRAWINGS

FIG. 3 illustrates one embodiment of a duplication filter table information.

DETAILED DESCRIPTION

Figure 1:
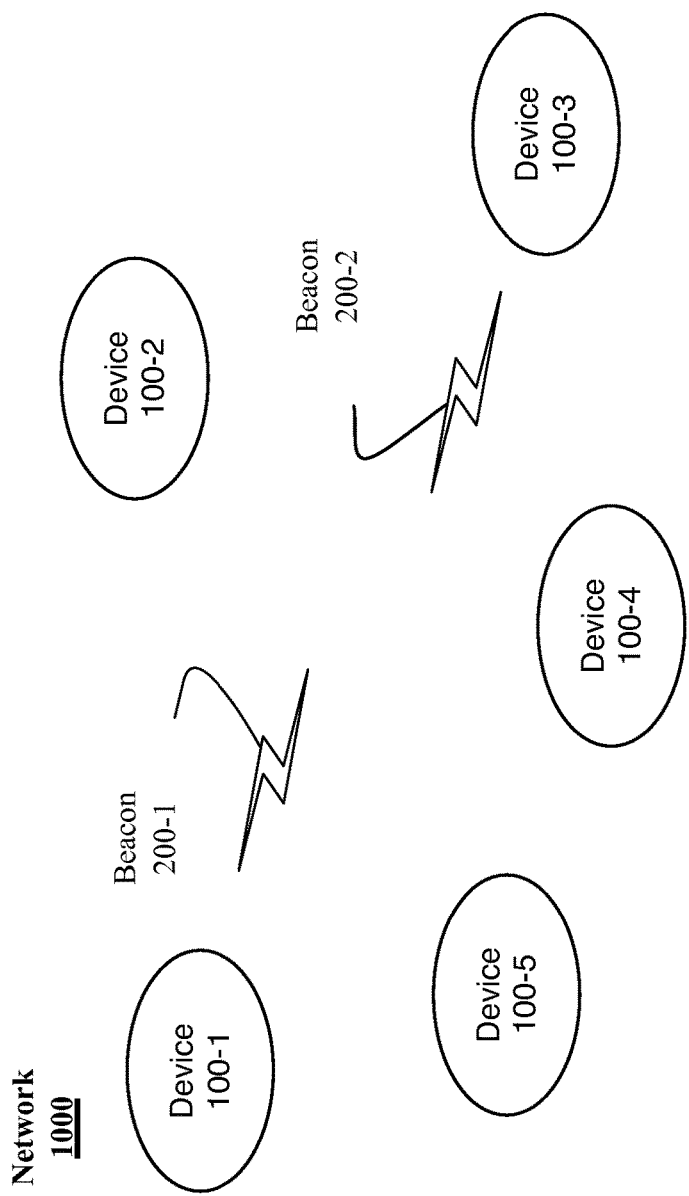
FIG. 1 illustrates one embodiment of a network.

The present disclosure is generally directed to filtering beacons broadcast by wireless device, such as, for example, Bluetooth Low Energy (BLE) devices. In particular, the present disclosure is directed to aging the filtering to account for whether the broadcasting device is still within range of the receiving device. For example, the present disclosure provides for filtering beacons broadcast by a BLE device by adding an indication to filter such beacons to a duplication filtering table. The indication to filter beacons broadcast by the BLE device in the duplication filtering table includes an indication of a time stamp corresponding to the last time a beacon was received from the BLE device. With some examples, the time stamp may be updated each time a beacon is received from the BLE device. In other examples, a counter may be used to indicate a time corresponding to the last time a beacon was received from the BLE device.

The entries in the duplication filtering table may be aged by determining whether the difference between the time stamp in the duplication filtering table and a current time exceed a threshold time. If the difference does exceed the threshold time, the entry in the duplication filtering table may be removed; while if the difference does not exceed the threshold time, the entry may be retained.

These examples and other examples of the present disclosure are provided in greater detail below. However, the general principal of the present disclosure provides that when a BLE beacon receiver is within range of a BLE beacon broadcaster, the BLE beacon receiver would receive beacons broadcast by the BLE broadcaster. Provided the BLE receiver is within range of the BLE broadcaster, the BLE receiver may repeatedly receive the same beacon, often with a very short interval between arrivals. As such, the BLE receiver can filter subsequent arrivals of the beacons from the same BLE broadcaster as described above. In particular, beacons may be filtered based on the aging mechanisms detailed herein. As such, the present disclosure provides that when BLE broadcasters and BLE receivers are in a static place for more than the aging time (e.g., the threshold time, or the like) the BLE receiver may not receive beacons from the BLE broadcasters. Furthermore, where the BLE broadcasters and BLE receivers are not static in position, each time a broadcaster and receiver move out of range of each other and back into range of each other, the receiver may receive broadcasts from the BLE broadcaster again.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology, by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

FIG. 1 illustrates a network 1000. The network 1000 includes devices 100-a, where "a" is a positive integer. In particular, devices 100-1 to 100-5 are shown. However, it is to be appreciated, that any number of devices 100-a may be implemented, and the number of devices depicted is merely shown at a quantity to facilitate understanding.

In general, the devices 100-a in the network 1000 may broadcast their connectivity and/or services via beacons (e.g., wireless beacons, or the like) represented as beacons 200-b, where "b" is a positive integer. For example, the devices 100-1 and 100-3 are depicted transmitting beacons 200-1 and 200-2, respectively. The other devices in the network may receive the beacons 200-1 and 200-2. In some examples, the beacons 200-1 and 200-2 may include indications of connectivity capabilities (Wi-Fi, Wi-Fi Direct (WFD), infrastructure, independent basic service set (IBSS), Ad-hoc, or the like) and services (e.g., print services, file sharing services, media streaming services, or the like) that are supported and/or available on the broadcasting device. With some examples, devices 100-*a* may advertise available connection capabilities and/or services via the beacons 200-*b*. With some examples, devices 100-*a* may request or solicit connection capabilities and/or services via the beacons 200-*b*. With some examples, devices 100-*a* may both advertise and solicit connection capabilities and/or services via the beacons 200-*b*.

In some examples, the network 1000, and particularly, the devices 100-*a* may be implemented according to various standards or technical specifications. In particular, the devices 100-*a* may be implemented according to standards promulgated by the Bluetooth Special Interest Group (SIG). For example, the devices 100-*a* may be implemented according to the Bluetooth SIG standard for BLE "Bluetooth Core Specification," v. 4.1, 2014. Furthermore, the beacons 200-*b* may be implemented according to a variety of beaconing technologies. In general, the beacons 200-*b* may be any of a variety of information elements, frames, bitmaps, or the like, configured to communicate connectivity and/or services as described herein. Examples are not limited in these contexts.

In general, the devices 100-*a* may be configured to filter beacons 200-*b* by determining a difference between a current time and a most recent time a beacon from a particular device 100-*a* was received; and either (1) continuing to filter beacons from the particular device 100-*a* if the difference between the current time and the most recent time is less than a threshold time or (2) stopping filtering beacons from the particular device 100-*a* if the difference between the current time and the most recent time is greater than or equal to the threshold time.

It is important to note, that the present disclosure discusses beacon filtering for Bluetooth, and particularly BLE beacons. However, the present disclosure may be applied to filter beacons from a wide variety of wireless and/or wired transmission. In general, the present disclosure may be applied to filter beacons broadcast using a wireless and/or wired connection. For example, the present disclosure may be applied to filter beacons broadcast using BLE, Infrared Data Association (IrDA), Wi-Fi, Z-Wave, Zigbee, or the like. However, for purposes of clarity and not limitation, the present discourse uses examples of filtering BLE beacons.

Figure 2:
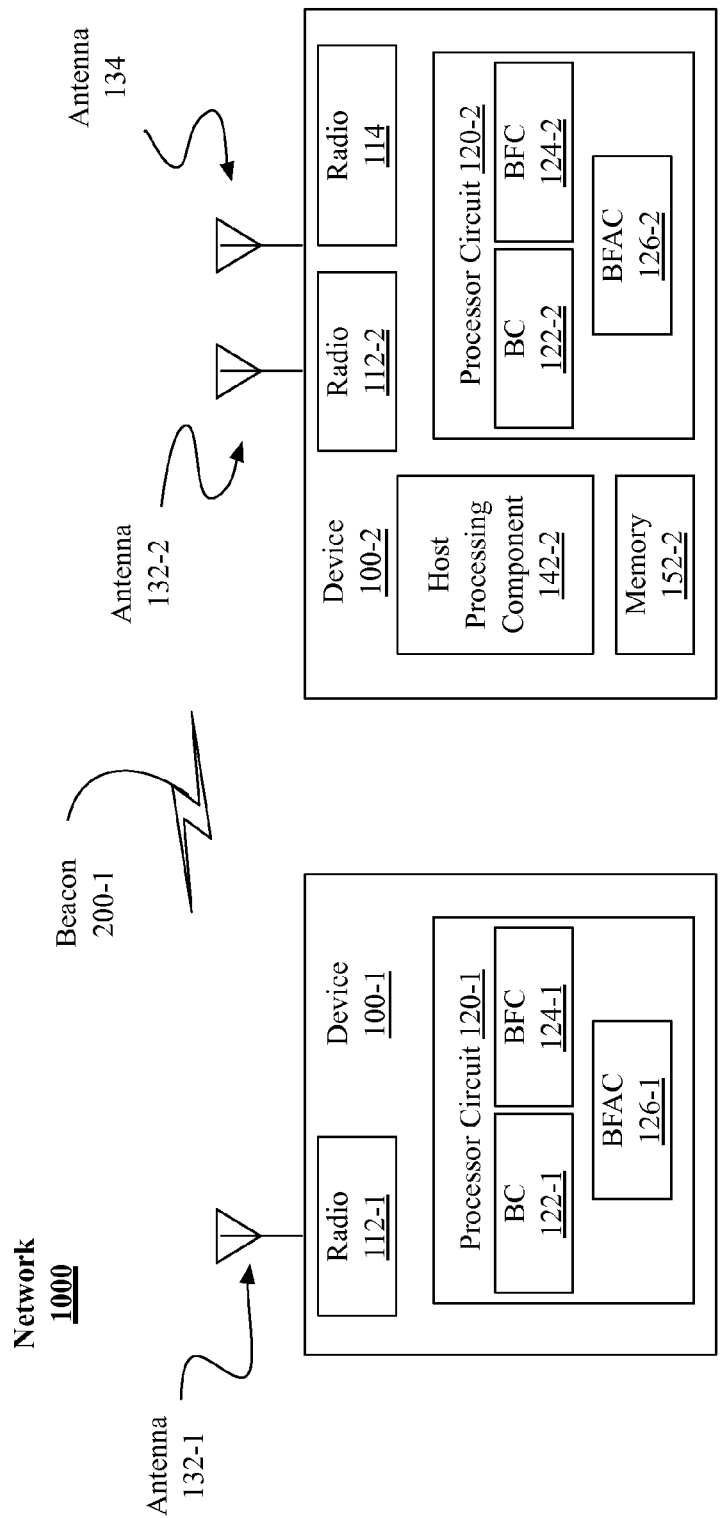
FIG. 2 illustrates one embodiment of a portion of the network of FIG. 1.

FIG. 2 illustrates a block diagram of an embodiment of a portion of the network 1000 of FIG. 1. In particular, FIG. 2 illustrates the device 100-1 broadcasting a beacon 200-1 and the device 100-2 receiving the beacon 200-1. The devices 100-1 and 100-2 can include one or more radios. For example, the device 100-1 is depicted including the radio 112-1 while the device 100-2 is depicted including the radio 112-2 and the radio 114. In general, the radios 112-1 and 112-2 may be any radio configured to communicate beacons 200-*b*. In particular, the radios 112-1 and 112-2 may be BLE radios. The radio 114 may be configured to communicate via a different communication technology that the radios 112-1 and 112-2 and/or communicate via another network (e.g. personal area network (PAN), Intranet, Internet, or the like). Furthermore, the devices 100-1 and 100-2 can includes an antenna (or antenna array). For example, the device 100-1 is depicted including the antenna 132-1 while the device 100-2 is depicted including the antennas 132-2 and 134. The antennas 132-1 and 132-2 are operably connected to the radio 112-1 and 112-2, respectively. The antenna 134 may be operably connected to the radio 114. Additionally, it is to be appreciated, that although not depicted, ones of the devices 100-1 and 100-2 may be provided with additional radio(s) and/or antennas.

Additionally, the devices 100-1 and 100-2 include a processor circuit 120-1 and a processor circuit 120-2, respectively. The processor circuits 120-1 and 120-2 are operably coupled to the radios 112-1 and 112-2, respectively. In some examples, the processor circuits 120-1 and/or 120-2 may be an application processor of the device. In some examples, the processor circuits 120-1 and/or 120-2 may be a baseband processor of the device. The devices 100-1 and 100-2 may also include a beacon component 122-1 and 122-2, respectively. The beacon components are referred to as "BC 122-*a*" in the figures. Furthermore, the devices 100-1 and 100-2 may also include a beacon filtering component 124-1 and 124-2, respectively. The beacon filtering components are referred to as "BFC 124-*a*" in the figures. Furthermore, the devices 100-1 and 100-2 may also include a beacon filter aging component 126-1 and 126-2, respectively. The beacon filter aging components are referred to as "BFAC 126-*a*" in the figures.

The beacon components 122-1 and 122-2, the beacon filtering components 124-1 and 124-2, and the beacon filter aging components 126-1 and 126-2 may comprise programming, functions, logic, parameters, and/or other information operative to implement particular capabilities for the devices 100-1 and 100-2. In some examples, the components 122-1, 124-1, and/or 126-1 and 122-2, 124-2, and/or 126-2 may be executable by the processing circuits 120-1 and 120-2, respectively. It is to be appreciated, that each of the devices 100-*a* depicted in FIG. 1 may be configured to filter beacons as described herein. However, for purposes of clarity of presentation only, beacon transmission is discussed herein from the perspective of the devices 100-1 and 100-3 while beacon filtering is discussed from the perspective of the device 100-2. Examples are not to be limited in this context.

Additionally, the devices 100-*a* may include a host processing component 142-*a* and a memory 152-*a*. For example, the device 100-2 is depicted including the host processing component 142-2 and the memory 152-2. In general, the host processing components 142-*a* may comprise logic, functions, and/or features to cause the device to perform various actions. For example, the host processing components 142-*a* may include processor component(s) (e.g., refer to FIG. 8) and corresponding software (e.g., drivers, operating system, applications, or the like) configured to execute instructions on the processor component. The memory 152-*a* may be any of variety of memories configure to store computer readable data and/or instructions (e.g., refer to FIGS. 7 and 8)

In general, the beacon component 122-1 may be configured to transmit the beacon 200-1. In particular, the beacon component 122-1 may repeatedly transmit (e.g., every n seconds, or the like) the beacon 200-1. The beacon component 122-1 may transmit the beacon 200-1 via the radio 112-1 and antenna 132-1.

Figure 4:
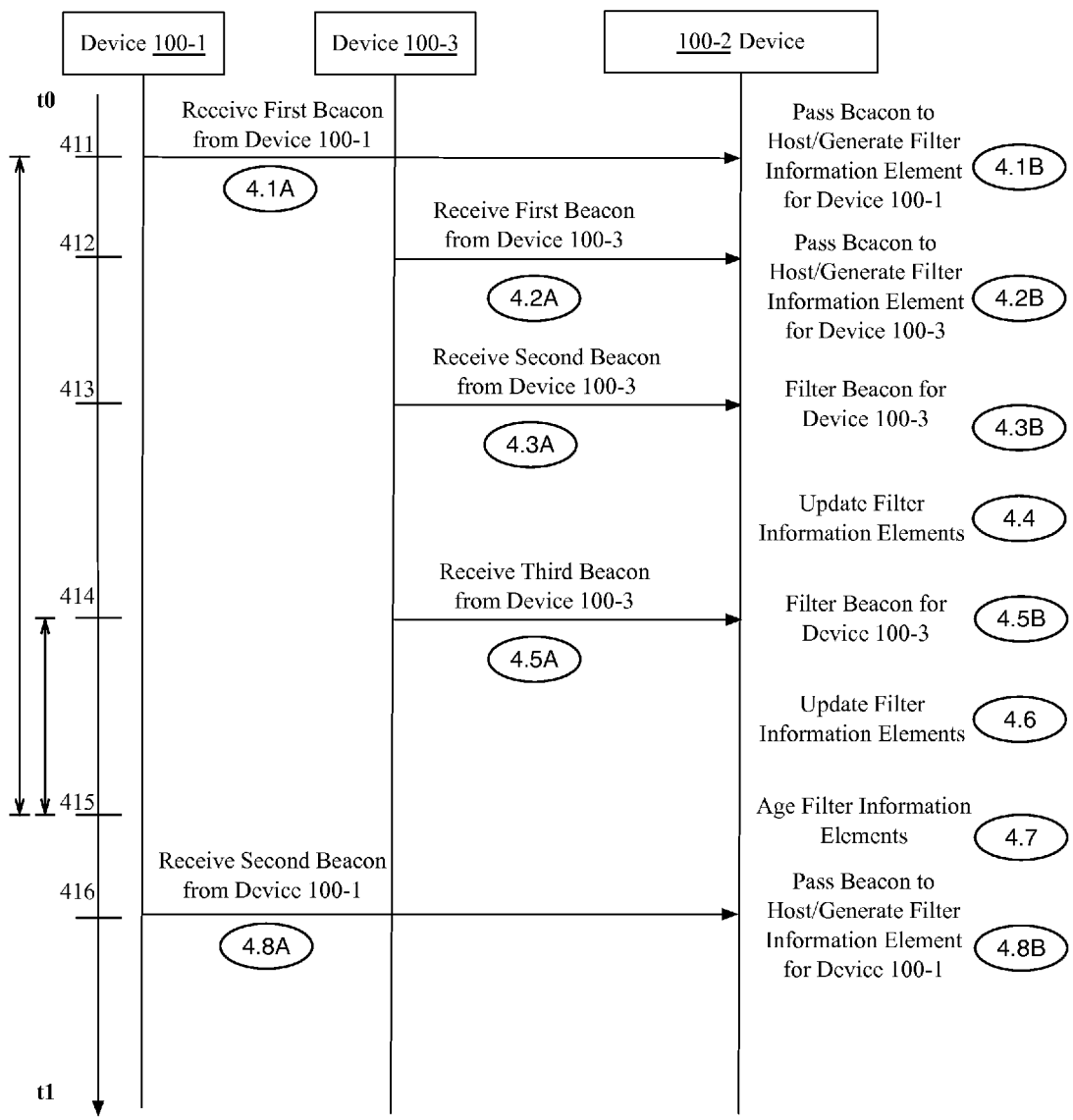
FIG. 4 illustrates an embodiments of a beacon filter aging technique.

The beacon component 122-2 may be configured to receive the beacon 200-1 (and other beacons, for example, refer to FIG. 4). In particular, the beacon component 122-2 may be configured to receive the beacon 200-1 (and other beacons) via the radio 112-2 and the antenna 132-2. Upon receipt of a beacon (e.g., the beacon 200-1, or the like), the beacon filter component 124-2 may be configured to determine whether to communicate the beacon to the host processing component 142-2. This is described in greater detail below (e.g., refer to FIGS. 3 and 4). However, the host processing component 142-2, upon receipt of a beacon, may determine (e.g., automatically, via a user input, or the like) that beacons from the particular device (e.g., beacons from the device 100-1, or the like) are to be filtered. Accordingly, the host processing component 142-2 may communicate an indication to filter beacons from the particular device to the beacon filtering component 124-2.

The beacon filtering component 124-2 may create a filter information element (e.g., refer to FIG. 3), the filter information element to include an indication to filter beacons from the device and an indication of a time stamp, the time stamp corresponding to a time a first beacon was received from the device. For example, the beacon filtering component 124-2 may generate a filter information element to include an indication to filter beacons from the device 100-1 and an indication of a time stamp a first beacon was received from the device 100-1. With some examples, the beacon filtering component 124-2 may store the filter information element in the memory 152-2.

The beacon component 122-2 and/or the beacon filtering component 124-2 may be configured to not communicate beacons to the host processing component 142-2 based on the filter information element. In some examples, the filter information element may be a duplication filtering table, a filtering bitmap, or the like. In some examples, the filter information element may include an indication of a media access control (MAC) address for the device to be filtered.

As described above, the present disclosure provides for aging of the filter information element. In particular, the beacon filter aging component 126-2 may be configured to update the time stamp in the filter information element, the updated time stamp to include an indication of a time a second beacon was received from the device to be filtered. For example, the beacon filter aging component 126-2, upon receipt of a beacon from the a device to be filtered, may update the filter information element corresponding to the device to include an indication the beacon was received. In a particular example, the beacon filter aging component 126-2 may update a filter information element corresponding to the device 100-1 based in part on receiving a subsequent beacon from the device 100-1, the updated filter information element to include an indication of a time stamp the subsequent beacon was received from the device 100-1.

Furthermore, the beacon filter aging component 126-2 may be configured to remove the indication to filter beacons from a particular device. For example, the beacon filter aging component 126-2 may be configured to remove the filter information element from a duplication filtering table based on the determination that a difference between the current time and the time stamp in the filter information element is greater than a threshold time. This is explained in greater detail below with reference to FIG. 4.

FIG. 3 illustrates an example duplication filtering table 300. As depicted, the duplication filter table 300 includes filter information elements 312-1, 312-2, to 312-N. Each of the filter information elements 312 includes an indication of a device to be filtered and a time stamp. For example, the filter information element 312-1 includes the device indication 322-1 and the time stamp indication 324-1. The beacon filtering component 124-2 may be configured to generate the filter information elements 312. For example, as described above, based on receiving an indication to filter beacons from the device 100-1, the beacon filtering component 124-2 may generate a filter information element (e.g., the filter information element 312-1, or the like) corresponding to the device 100-1. As such, the device indication 322-1 may include an indication of the device 100-1 (e.g., a MAC address of the device 100-1, or the like) and the time stamp indication may include an indication of the time the beacon was received from the device 100-1.

With some examples, the time stamp indications 324 may be an actual time (e.g., GMT, local system time, or the like). Accordingly, the beacon filter aging component 126-2 may be configured to generate and/or update the time stamp indications 324 based on the time beacons are received. For example, each time a beacon is received from a device being filtered, the beacon filter aging component 126-2 may update the time stamp indication 324 corresponding to that device to indicate the time the recent beacon was received. Furthermore, the beacon filter aging component 126-2 may remove filter information elements 312 from the duplication table 300 when the difference between the time stamp indication and a current time exceeds (or is greater than or equal to) a threshold time. With some examples, the threshold time may be 1 second, 2 seconds, 3 seconds, 4 seconds, 5 seconds, 10 seconds, or the like.

With some examples, the time stamp indication may be a counter. For example, the beacon filter aging component 126-2 may be configured to repeatedly (e.g., every 0.2 seconds, every 0.5 seconds, every 1 second, every 2 seconds, every 3 seconds, every 4 seconds, every 5 seconds, every 10 seconds or the like) increment the counter of each time stamp indication. Furthermore, the beacon filter aging component 126-2 may be configured to "zero" (e.g., set to a base number, set to "0", or the like) a time stamp indication for a particular device upon receipt of a beacon from that particular device. Additionally, the beacon filter aging component 126-2 may remove filter information elements 312 from the duplication table 300 when the time stamp indication (e.g., the counter) exceeds (or is greater than or equal to) a threshold number.

In some examples, the filter information elements 312, and particularly, the indications 322 and 324 can be fields, bit maps, or the like, set to indicate information about the device and the time stamp, respectively. It is to be appreciated, that in some examples, the indications (e.g., 322 and 324, or the like) may be contiguously located in the filter information element 312. Furthermore, it is to be appreciated, that the example duplication filtering table 300 shown in FIG. 3 is given for convenience and clarity of presentation and is not intended to be limiting. It is to be appreciated, that filtering information and particularly, the filter information elements may be implemented in a variety of manners, each of which may be configured to implement the aging mechanisms described herein.

FIG. 4 illustrates an example technique 1100. In some examples, the technique 1100 illustrates filtering beacons, such as, for example, BLE beacons. In particular, the technique 1100 details filtering beacons and aging the beacon filtering, such that, for example, a receiving device that leaves the beacon broadcast range of a transmitting device may receive beacons from the transmitting device upon returning to the broadcast range of the transmitting device. For these examples, at least some components of network 1000 shown in FIG. 1 may be related to the technique 1100. For example, as shown in FIG. 4, the device 100-2 may implement the technique 1100. In particular, the device 110-2 may receive beacons from the devices 100-1 and 100-3 and may implement the technique 1100. It is important to note, that the technique 1100 is depicted proceeding from time "t0" to time "t1." The time scale is merely shown for convenience and clarity and is not intended to be representative of an actual time scale. Furthermore, various time intervals (e.g., 411, 412, etc.) are shown. These intervals are also not drawn to scale, but instead are marked for convenience in discussing the time stamp indications referenced herein.

Figure 5A:
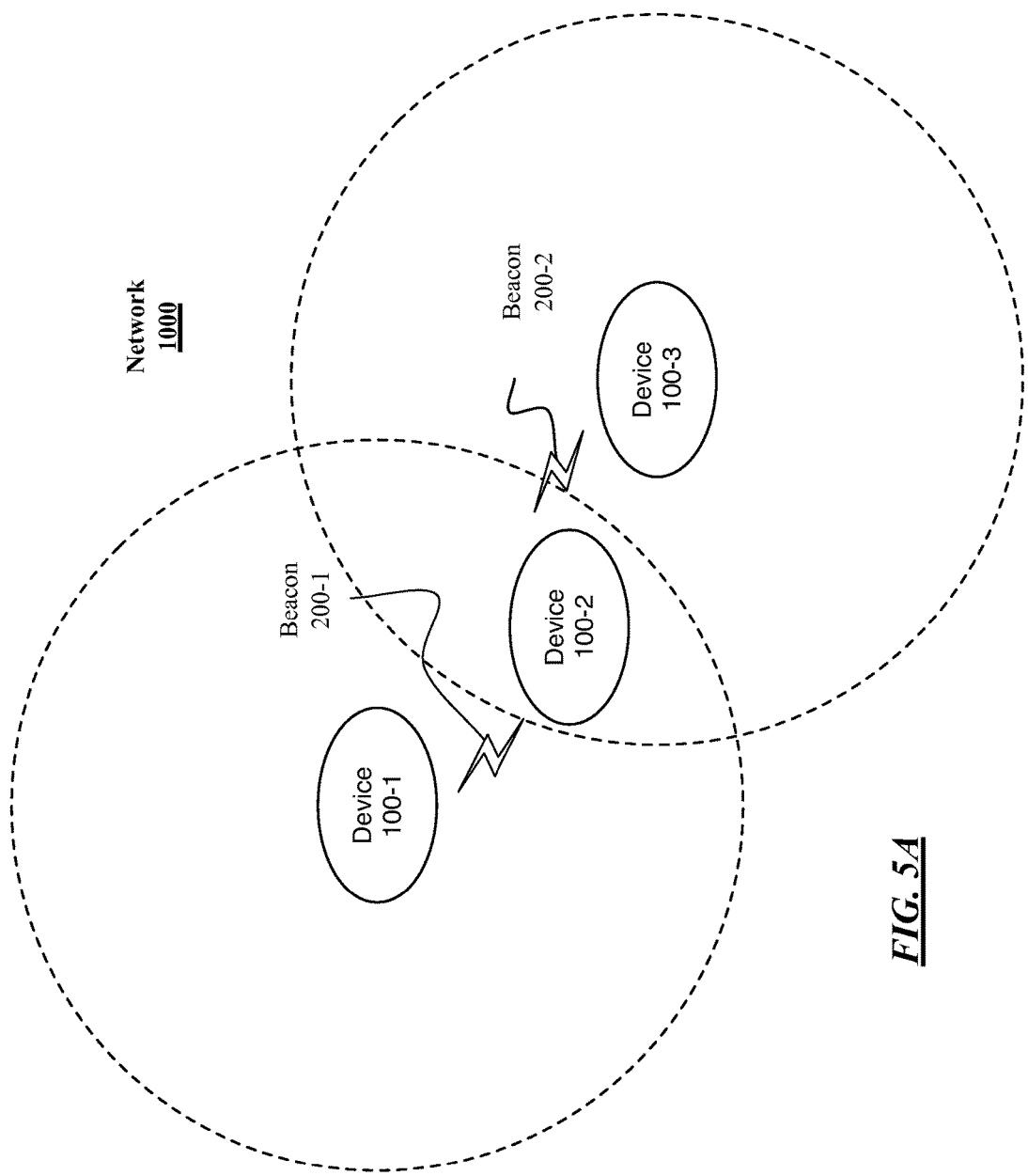
FIGS. 5A-5C illustrate examples of a portion of the network of FIG. 1 and beacon broadcast ranges.
Figure 5B:
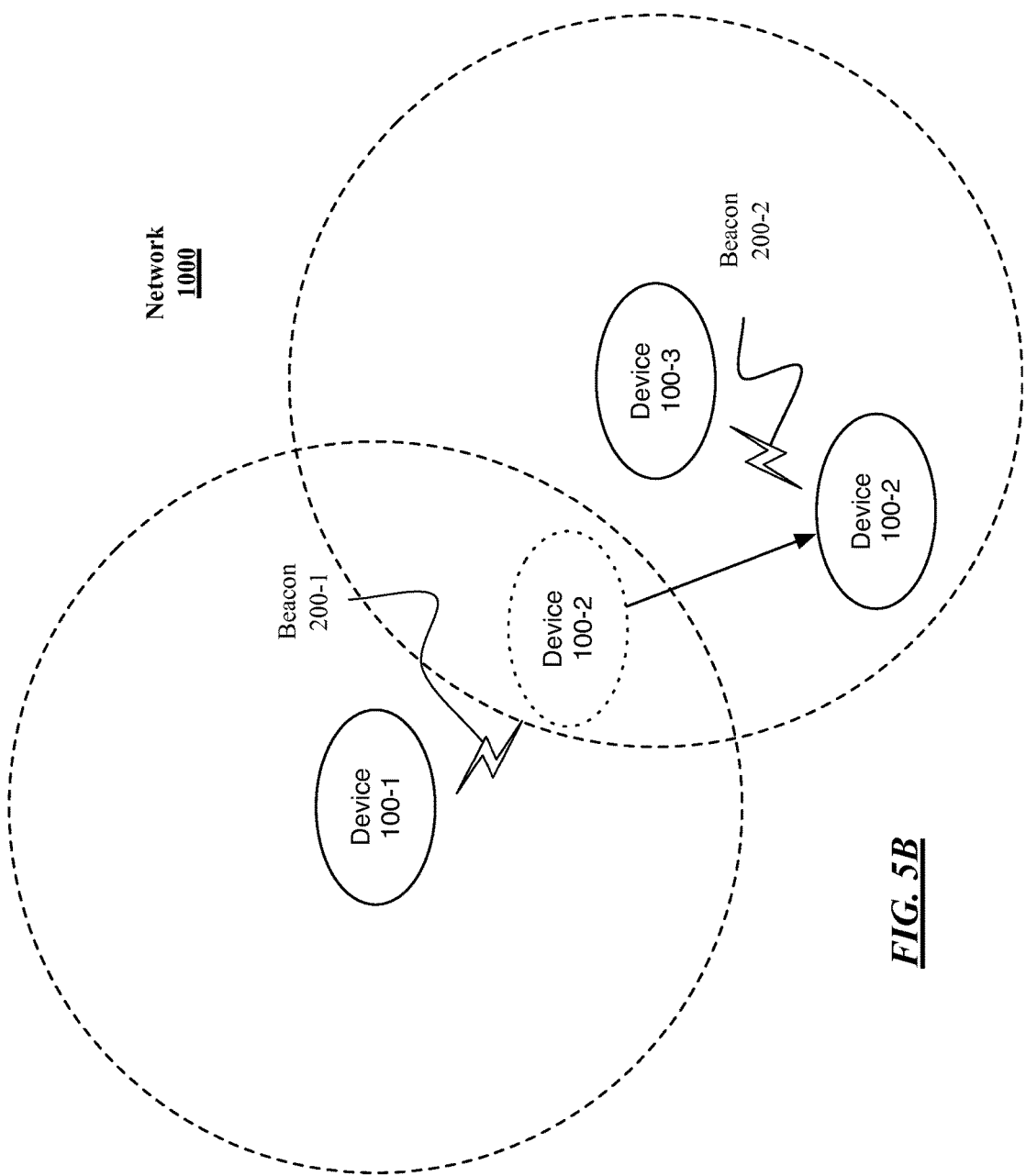
Figure 5C:
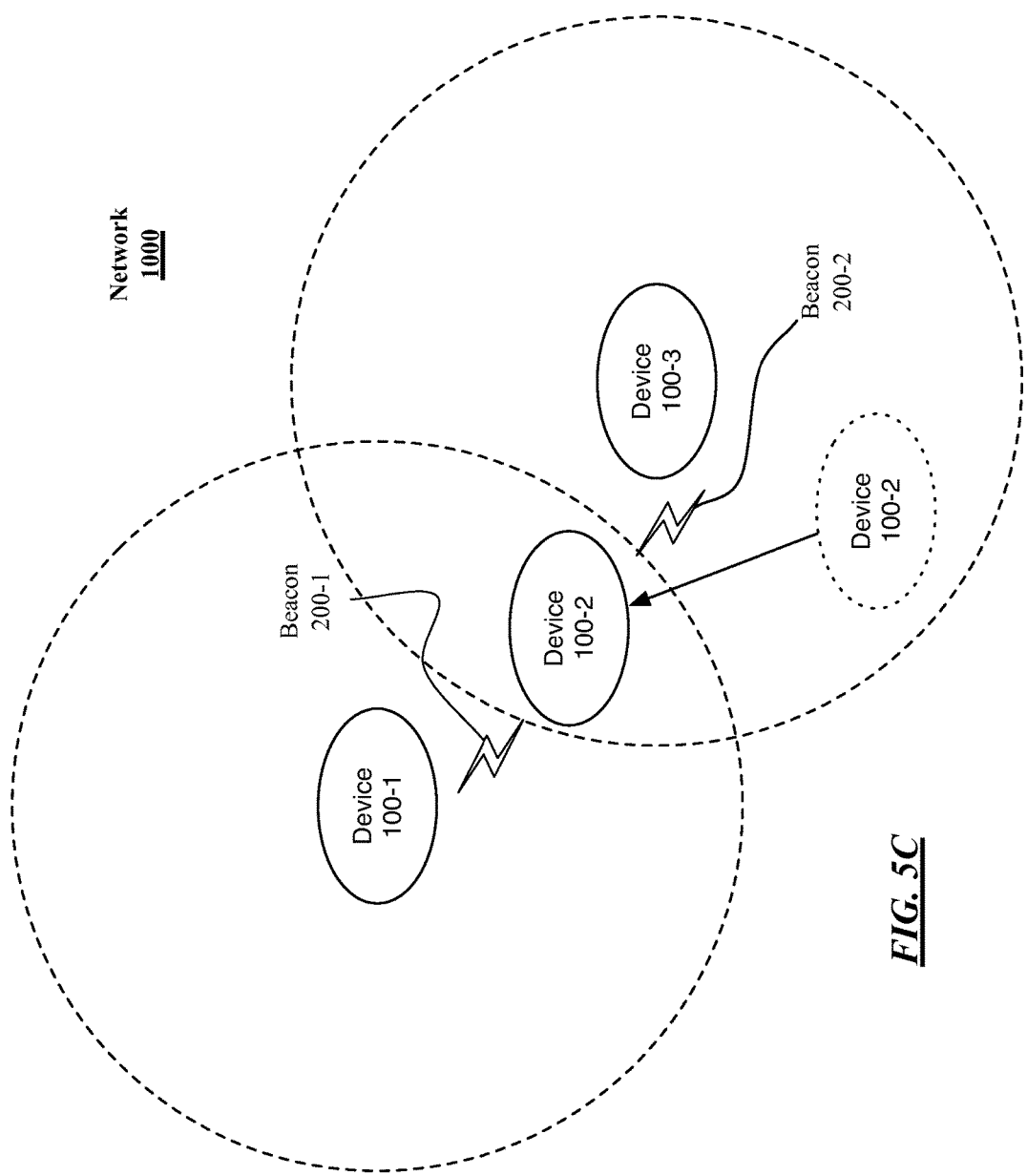

The technique 1100 is described in conjunction with FIGS. 5A-5C. These figures illustrate block diagrams of a portion of the network 1000. In particular, FIGS. 5A-5C illustrate the device 100-2 moving in and out of range of the device 100-1. Furthermore, the technique 1100 is described in conjunction with the duplication filtering table 300 shown in FIG. 3. However, the example technique 1100 is not limited to implementations using elements of network 100 or the duplication filtering table 300 shown or described in FIGS. 1, 3, and 5A-5C.

Turning briefly to FIG. 5A, the devices 100-1 and 100-3 are depicted broadcasting beacons 200-1 and 200-2, respectively. Additionally, broadcast ranges 512-1 and 512-2 are depicted, which corresponds to the range of the beacons 200-1 and 200-2, respectively. The device 100-2 is also depicted. In particular, the device 100-2 is depicted within the broadcast ranges 512-1 and 512-2. As such, the device 100-2 may receive both beacons 200-1 and 200-2. Said differently, the device 100-2 may receive beacons broadcast from both devices 100-1 and 100-3.

Returning to FIG. 4, the technique 1100 may begin at process 4.1A. At process 4.1A (Receive First Beacon from Device 100-1), logic or features at the device 100-2 may receive a first beacon from the device 100-1. For example, the beacon component 122-2 may receive a beacon (e.g., a BLE beacon, or the like) from the device 100-1 at time 411. Continuing to process 4.1B (Pass Beacon to Host/Generate Filter Information Element for Device 100-1), logic or features at the device 100-2 may communicate the received beacon to a host processing component and generate a filter information element for the device 100-1. For example, the beacon filtering component 124-2 may communicate the beacon 200-1 to the host processing component 142-2 and may generate the filter information element 312-1 to include an indication of the device 100-1 as the device indication 322-1 and an indication of time 411 as the time stamp indication 324-1. In particular, the beacon filtering component 124-2 may receive an indication to filter beacons from the device 100-1 from the host processing component 142-2, and may generate the filter information element 312-1 based on receiving the indication from the host processing component 142-2.

Moving to process 4.2A (Receive First Beacon from Device 100-3), logic or features at the device 100-2 may receive a first beacon from the device 100-3. For example, the beacon component 122-2 may receive a beacon (e.g., a BLE beacon, or the like) from the device 100-3 at time 412. Continuing to process 4.2B (Pass Beacon to Host/Generate Filter Information Element for Device 100-3), logic or features at the device 100-2 may communicate the received beacon to a host processing component and generate a filter information element for the device 100-3. For example, the beacon filtering component 124-2 may communicate the beacon 200-2 to the host processing component 142-2 and may generate the filter information element 312-2 to include an indication of the device 100-3 as the device indication 322-2 and an indication of time 412 as the time stamp indication 324-2. In particular, the beacon filtering component 124-2 may receive an indication to filter beacons from the device 100-3 from the host processing component 142-2, and may generate the filter information element 312-2 based on receiving the indication from the host processing component 142-2.

Turning briefly to FIG. 5B, the devices 100-1 and 100-3 are again depicted broadcasting beacons 200-1 and 200-2, respectively. Additionally, broadcast ranges 512-1 and 512-2 are also depicted. However, the device 100-2 has moved from a first position 514 to a second position 516. In particular, the device 100-2 is depicted at the second position 516, which is within the broadcast range 512-2 but outside the broadcast range 512-1. As such, the device 100-2 may receive beacon 200-2 but not beacon 200-1. Said differently, the device 100-2 may only receive beacons broadcast from the device 100-3.

Returning to FIG. 4, moving to process 4.3A (Receive Second Beacon from Device 100-3), logic or features at the device 100-2 may receive a second beacon from the device 100-3. For example, the beacon component 122-2 may receive a beacon (e.g., a BLE beacon, or the like) from the device 100-3 at time 413. Continuing to process 4.3B (Filter Beacon for Device 100-3), logic or features at the device 100-2 may filter the beacon received at time 412. In particular, the device 100-2 may not communicate the beacon received at time 412 to the host processing component 142-2.

Moving to process 4.4 (Update Filter Information Elements), logic or features at the device 100-2 may update the filter information elements. For example, the beacon filter aging component 126-2 may update the filter information elements 312-1 and 312-2 to reflect the time beacons were last received from the devices 100-1 and 100-3. More specifically, the beacon filter aging component 126-2 may update the time stamp indication 324-2 of the filter information element 312-2 to indicate the time 413 (e.g., instead of the time 412, or the like).

Moving to process 4.5A (Receive Third Beacon from Device 100-3), logic or features at the device 100-2 may receive a third beacon from the device 100-3. For example, the beacon component 122-2 may receive a beacon (e.g., a BLE beacon, or the like) from the device 100-3 at time 414. Continuing to process 4.5B (Filter Beacon for Device 100-3), logic or features at the device 100-2 may filter the beacon received at time 414. In particular, the device 100-2 may not communicate the beacon received at time 414 to the host processing component 142-2.

Moving to process 4.6 (Update Filter Information Elements), logic or features at the device 100-2 may update the filter information elements. For example, the beacon filter aging component 126-2 may update the filter information elements 312-1 and 312-2 to reflect the time beacons were last received from the devices 100-1 and 100-3. More specifically, the beacon filter aging component 126-2 may update the time stamp indication 324-2 of the filter information element 312-2 to indicate the time 414 (e.g., instead of the time 413, or the like).

Moving to process 4.7 (Age Filter Information Elements), logic or features at the device 100-2 may "age" the filter information elements. For example, the beacon filter aging component 126-2 may determine whether a difference between a current time and the time stamps in the filter information elements is greater than a threshold time and remove a filter information element based on the determination that the difference between the current time and the time stamp in the filter information element is greater than the threshold time. In a particular example, the beacon filter aging component 126-2 may: determine the difference between the current time 415 and the time 411 indicated in the time stamp indication 324-1 of the filter information element 312-1; determine whether the difference between the time 415 and the time 411 is greater than a threshold difference; and remove the filter information element 312-1 based on the determination that the difference between the time 415 and the time 411 is greater than (or equal to, or the like) the threshold. As another particular example, the beacon filter aging component 126-2 may: determine the difference between the current time 415 and the time 414 indicated in the time stamp indication 324-2 of the filter information element 312-2; determine whether the difference between the time 415 and the time 414 is greater than a threshold difference; and not remove the filter information element 312-2 based on the determination that the difference between the time 415 and the time 414 is less than the threshold.

Turning briefly to FIG. 5C, the devices 100-1 and 100-3 are again depicted broadcasting beacons 200-1 and 200-2, respectively. Additionally, broadcast ranges 512-1 and 512-2 are also depicted. However, the device 100-2 has moved back to the first position 514 from the second position 516. In particular, the device 100-2 is again depicted at the first position 516, which is within the broadcast ranges 512-1 and 512-2. As such, the device 100-2 may receive beacons 200-1 and 200-2. Said differently, the device 100-2 may receive beacons broadcast from the devices 100-1 and 100-3.

Returning to FIG. 4, moving to process 4.8A (Receive Second Beacon from Device 100-1), logic or features at the device 100-2 may receive a second beacon from the device 100-1. For example, the beacon component 122-2 may receive a beacon (e.g., a BLE beacon, or the like) from the device 100-1 at time 416. Continuing to process 4.8B (Pass Beacon to Host/Generate Filter Information Element for Device 100-1), logic or features at the device 100-2 may communicate the received beacon to a host processing component and generate a filter information element for the device 100-1. For example, the beacon filtering component 124-2 may communicate the beacon 200-1 to the host processing component 142-2 and may generate the filter information element 312-1 to include an indication of the device 100-1 as the device indication 322-1 and an indication of time 416 as the time stamp indication 324-1. In particular, the beacon filtering component 124-2 may receive an indication to filter beacons from the device 100-1 from the host processing component 142-2, and may generate the filter information element 312-1 based on receiving the indication from the host processing component 142-2.

It is important to note, that the second beacon received from the device 100-1 may be communicated to a host (e.g., the host processing component 142-2) because the initial filter information element corresponding to the device 100-1 was "aged" out of the duplication filter table as described above.

Figure 6:
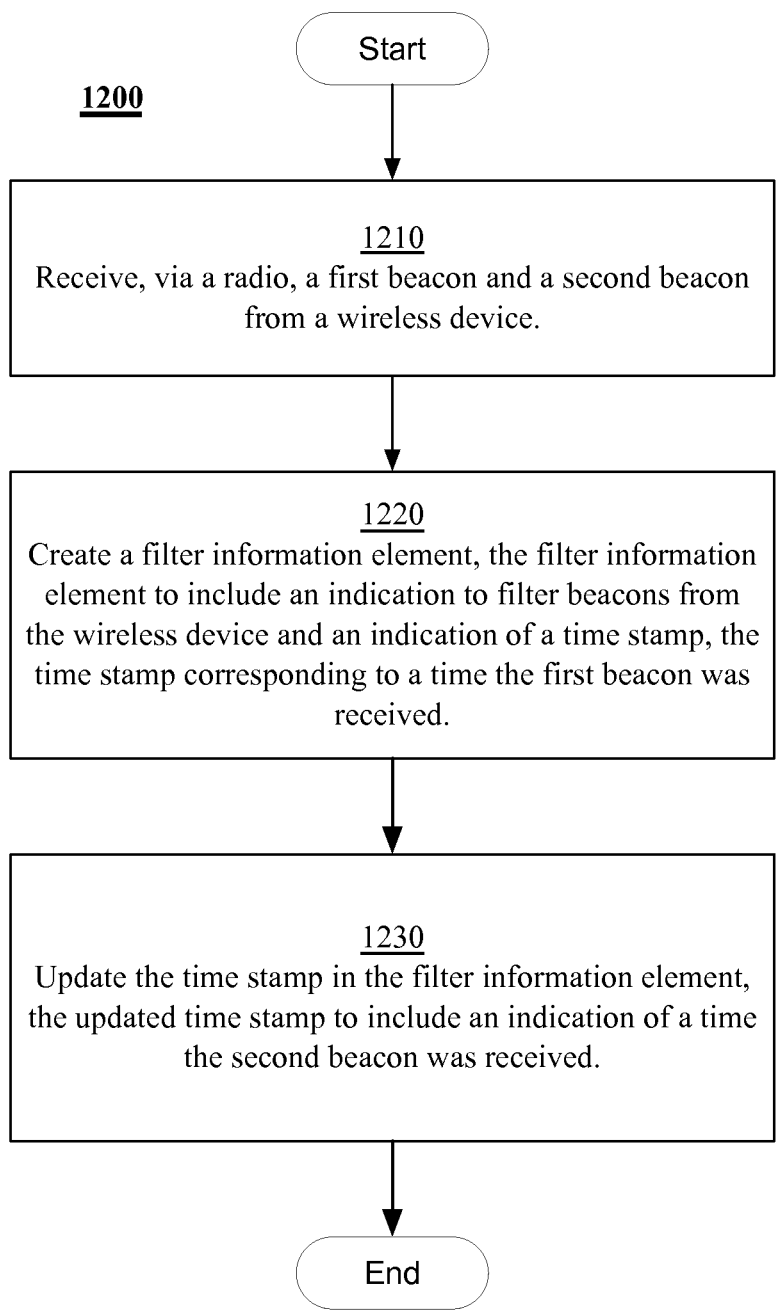
FIG. 6 illustrates an embodiment of a logic flow.

FIG. 6 illustrates an example of a logic flow 1200 representative of at least some operations executed by one or more logic, features, or devices described herein. In general, the logic flow 600 may be representative of some or all of the operations executed by logic and/or features of the devices 100-a of the network 1000. In particular, the logic flow 1200 depicted in this figure may be representative of operations performed by the device 100-2 in "aging" filter elements as described herein. It is to be appreciated, that although the example logic flow is described with reference to the network 1000 and particularly the device 100-2 of FIGS. 1-2 and to the duplication filter table 300 of FIG. 3. However, this is not intended to be limiting and is merely done for clarity of presentation.

Turning more specifically to FIG. 6, the logic flow 1200 may begin at block 1210. At block 1210, "receive, via a radio, a first beacon and a second beacon from a wireless device" the device 100-2 may receive the beacons (e.g., BLE beacons, or the like) from a wireless device. For example, the device 100-2 may receive a first beacon and a second beacon (e.g., as BLE beacons 200-1, or the like) from the wireless device 100-3 (e.g., as shown in FIG. 4). In particular, the beacon component 122-2 may receive the beacons from the device 100-3.

Continuing to block 1220, "create a filter information element, the filter information element to include an indication to filter beacons from the wireless device and an indication of a time stamp, the time stamp corresponding to a time the first beacon was received" the device 100-2 may create a filter information element including an indication to filter beacons from the wireless device and an indication of a time stamp the first beacon was received. For example, the beacon filtering component 124-2 may generate a filter information element including an indication to filter beacons from the device 100-3 and an indication of the time the first beacon was received (e.g., the time 412 shown in FIG. 4, or the like).

Continuing to block 1230, "update the times stamp in the filter information element, the updated time stamp to include an indication of a time the second beacon as received. For example, the beacon filter aging component 126-2 may update the filter information element to include an indication of the time the second beacon was received (e.g., the time 413 shown in FIG. 4, or the like).

Figure 7:
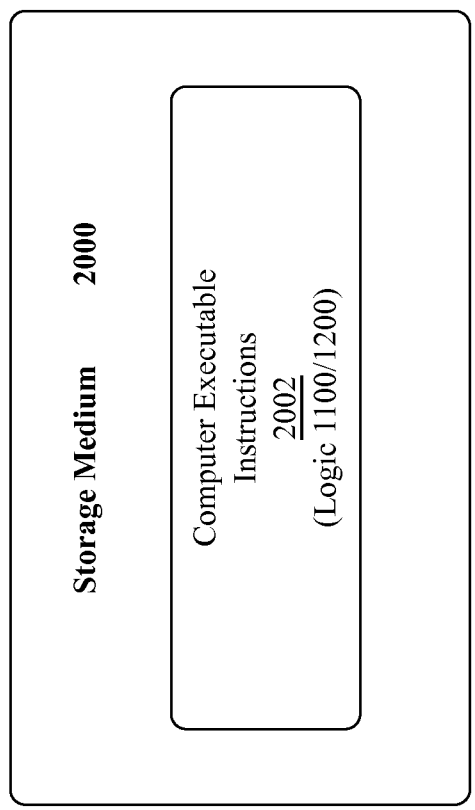
FIG. 7 illustrates one embodiment of a storage medium.

FIG. 7 illustrates an embodiment of a storage medium 2000. The storage medium 2000 may comprise an article of manufacture. In some examples, the storage medium 2000 may include any non-transitory computer readable medium or machine readable medium, such as an optical, magnetic or semiconductor storage. The storage medium 2000 may store various types of computer executable instructions e.g., 2002). For example, the storage medium 2000 may store various types of computer executable instructions to implement logic flow 1100. In some examples, the storage medium 2000 may store various types of computer executable instructions to implement logic flow 1200.

Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 8:
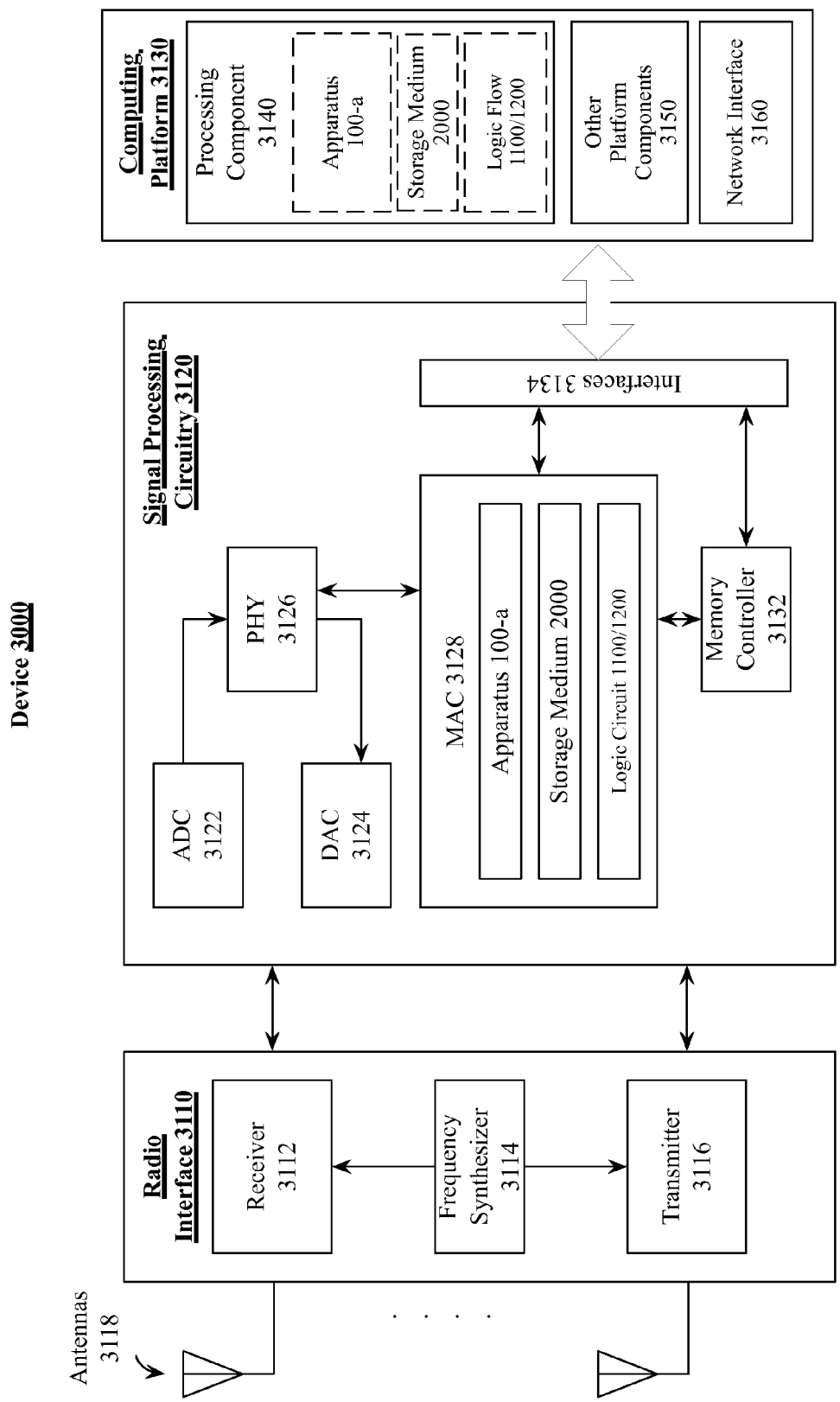
FIG. 8 illustrates one embodiment of a device.

FIG. 8 illustrates an embodiment of a device 3000. In some examples, device 3000 may be configured or arranged for wireless communications in a network such that the network 1000 shown in FIG. 1. In some examples, one of the devices 100-a may be implemented in the device 3000. For example, the device 3000 may implement the device as apparatus 100-a. Additionally, the device 3000 may implement storage medium 2000 and/or a logic circuit 1100/1200. The logic circuits may include physical circuits to perform operations described for the apparatus 100-a, storage medium 2000, logic flow 1100 and/or logic flow 1200. As shown in FIG. 8, device 3000 may include a radio interface 3110, baseband circuitry 3120, and computing platform 3130, although examples are not limited to this configuration.

The device 3000 may implement some or all of the structure and/or operations for the apparatus 100-a, the storage medium 2000 and/or the logic circuit 1100/1200 in a single computing entity, such as entirely within a single device. The embodiments are not limited in this context.

Radio interface 3110 may include a component or combination of components adapted for transmitting and/or receiving single carrier or multi-carrier modulated signals (e.g., including complementary code keying (CCK) and/or orthogonal frequency division multiplexing (OFDM) symbols and/or single carrier frequency division multiplexing (SC-FDM symbols) although the embodiments are not limited to any specific over-the-air interface or modulation scheme. Radio interface 3110 may include, for example, a receiver 3112, a transmitter 3116 and/or a frequency synthesizer 3114. Radio interface 3110 may include bias controls, a crystal oscillator and antennas 3118-1 to 3118-$f$. In another embodiment, radio interface 3110 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 3120 may communicate with radio interface 3110 to process receive and/or transmit signals and may include, for example, an analog-to-digital converter 3122 for down converting received signals, a digital-to-analog converter 3124 for up converting signals for transmission. Further, baseband circuitry 3120 may include a baseband or physical layer (PHY) processing circuit 3126 for PHY link layer processing of respective receive/transmit signals. Baseband circuitry 3120 may include, for example, a processing circuit 3128 for medium access control (MAC)/data link layer processing. Baseband circuitry 3120 may include a memory controller 3132 for communicating with MAC processing circuit 3128 and/or a computing platform 3130, for example, via one or more interfaces 3134.

In some embodiments, PHY processing circuit 3126 may include a frame construction and/or detection module, in combination with additional circuitry such as a buffer memory, to construct and/or deconstruct communication frames (e.g., containing subframes). Alternatively or in addition, MAC processing circuit 3128 may share processing for certain of these functions or perform these processes independent of PHY processing circuit 3126. In some embodiments, MAC and PHY processing may be integrated into a single circuit.

Computing platform 3130 may provide computing functionality for device 3000. As shown, computing platform 3130 may include a processing component 3140. In addition to, or alternatively of, baseband circuitry 3120 of device 3000 may execute processing operations or logic for the apparatus 100*a*, storage medium 2000, and logic circuits 1100/1200/1300 using the processing component 3130. Processing component 3140 (and/or PHY 3126 and/or MAC 3128) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 3130 may further include other platform components 3150. Other platform components 3150 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 3130 may further include a network interface 3160. In some examples, network interface 3160 may include logic and/or features to support network interfaces operated in compliance with one or more wireless broadband technologies such as those described in one or more standards associated with IEEE 802.11 such as IEEE 802.11u or with technical specification such as WFA Hotspot 2.0.

Device 3000 may be part of a device in a network and may be included in various types of computing devices to include, but not limited to, user equipment, a computer, a personal computer (PC), a desktop computer, a laptop computer, a notebook computer, a netbook computer, a tablet computer, an ultra-book computer, a smart phone, embedded electronics, a gaming console, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of device 2000 described herein; may be included or omitted in various embodiments of device 2000, as suitably desired. In some embodiments, device 2000 may be configured to be compatible with protocols and frequencies associated with IEEE 802.11 Standards or Specification and/or 3GPP Standards or Specifications for MIMO systems, although the examples are not limited in this respect.

The components and features of device 3000 may be implemented using any combination of discrete circuitry, application specific integrated circuits (ASICs), logic gates and/or single chip architectures. Further, the features of device 3000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 3000 shown in the block diagram of FIG. 8 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 9:
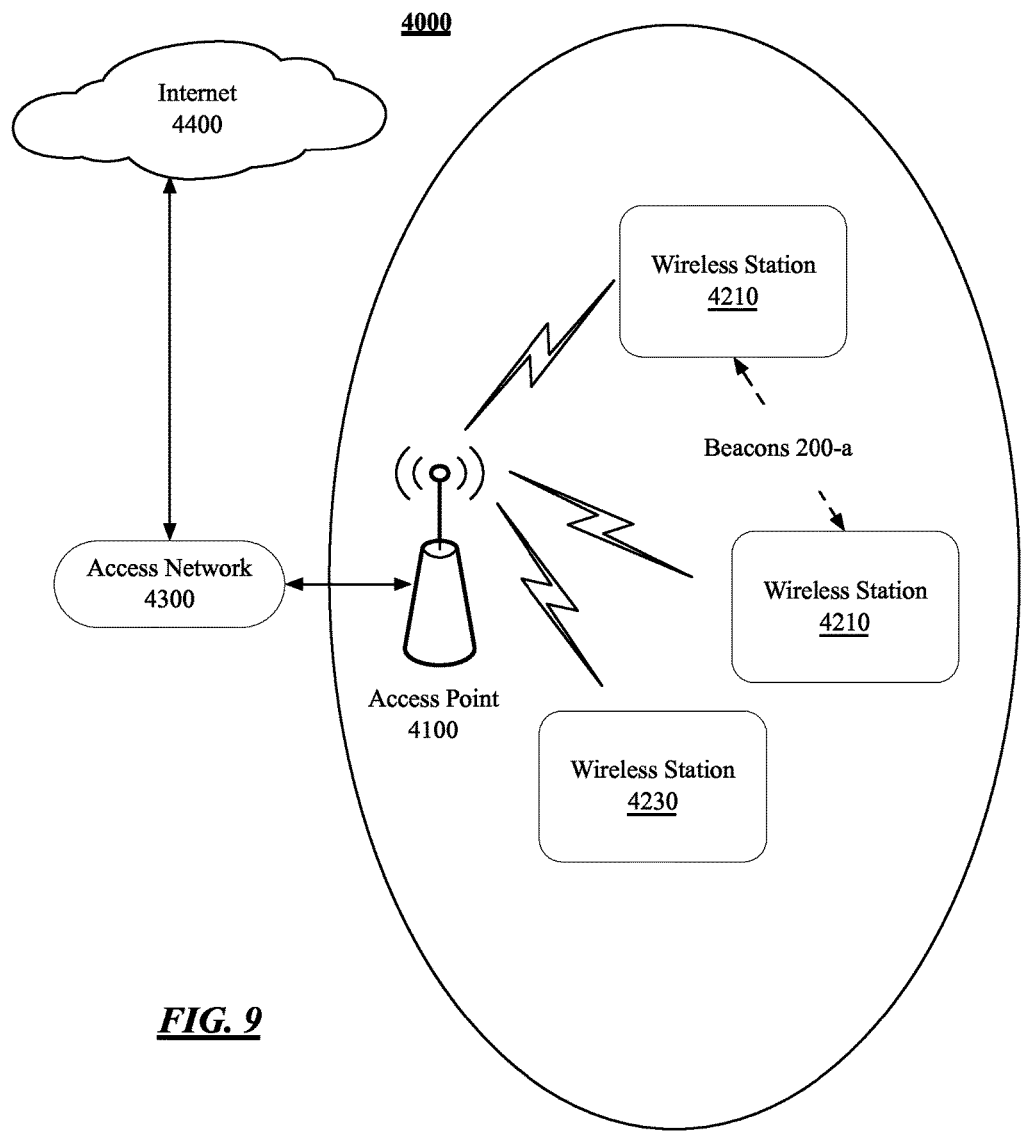
FIG. 9 illustrates one embodiment of a wireless network.

FIG. 9 illustrates an embodiment of a wireless network 4000. As shown in this figure, wireless network 4000 comprises an access point 4100 and wireless stations 4210, 4220, and 4230. In various embodiments, wireless network 4000 may comprise a wireless local area network (WLAN), such as a WLAN implementing one or more Institute of Electrical and Electronics Engineers (IEEE) 802.11 standards (sometimes collectively referred to as "Wi-Fi"). In some other embodiments, wireless network 4000 may comprise another type of wireless network, and/or may implement other wireless communications standards. In various embodiments, for example, wireless network 4000 may comprise a WWAN or WPAN rather than a WLAN. The embodiments are not limited to this example.

In some embodiments, wireless network 4000 may implement one or more broadband wireless communications standards, such as 3G or 4G standards, including their revisions, progeny, and variants. Examples of 3G or 4G wireless standards may include without limitation any of the IEEE 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1×RTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8-12 of LTE/System Architecture Evolution (SAE), and so forth. The embodiments are not limited in this context.

In various embodiments, wireless stations 4210, 4220, and 4230 may communicate with access point 4100 in order to obtain connectivity to one or more external data networks. In some embodiments, for example, wireless stations 4210, 4220, and 4230 may connect to the Internet 4400 via access point 4100 and access network 4300. In various embodiments, access network 4300 may comprise a private network that provides subscription-based Internet-connectivity, such as an Internet Service Provider (ISP) network. The embodiments are not limited to this example.

In various embodiments, two or more of wireless stations 4210, 4220, and 4230 may communicate with each other directly by exchanging peer-to-peer communications. For example, as depicted in FIG. 9, wireless stations 4210 and 4220 communicate with each other directly by exchanging peer-to-peer communications 4500. In some embodiments, such peer-to-peer communications may be performed according to one or more standards, such as, for example, the Bluetooth standard referenced above. The embodiments, however, are not limited to these examples.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose might be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

The disclosure now turns to providing various example implementations. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. The disclosure now turns to providing additional examples.

Example 1

An apparatus for a wireless device, the apparatus comprising: circuitry; a beacon component executable by the circuitry, the beacon component to receive a first beacon and a second beacon from a wireless device; a beacon filtering component executable by the circuitry, the beacon filtering component to create a filter information element, the filter information element to include an indication to filter beacons from the wireless device and an indication of a time stamp, the time stamp corresponding to a time the first beacon was received; and a beacon filter aging component executable by the circuitry, the beacon filter aging component to update the time stamp in the filter information element, the updated time stamp to include an indication of a time the second beacon was received.

Example 2

The apparatus of example 1, the beacon filter aging component to determine whether a difference between a current time and the time stamp in the filter information element is greater than a threshold time and to remove the indication to filter beacons from the wireless device based on the determination that the difference between the current time and the time stamp in the filter information element is greater than the threshold time.

Example 3

The apparatus of example 2, the beacon filtering component to add the filter information element to a duplication filtering table.

Example 4

The apparatus of example 3, the beacon filter aging component to remove the filter information element from the duplication filtering table based on the determination that the difference between the current time and the time stamp in the filter information element is greater than the threshold time.

Example 5

The apparatus of example 1, the beacon component to receive a third beacon from the wireless device, the beacon filter aging component to update the time stamp in the filter information element, the updated time stamp to include an indication of a time the third beacon was received.

Example 6

The apparatus of example 5, the beacon filter aging component to update the time stamp based at least in part on receiving either the second beacon or the third beacon.

Example 7

The apparatus of example 1, comprising a host processing component, the beacon component to pass the first beacon to the host processing component and the beacon filtering component to receive an indication from the host processing component to filter beacons from the wireless device, the beacon filtering component to generate the filter information element based on the received indication.

Example 8

The apparatus of any one of examples 1 to 7, comprising a radio operably coupled to the circuitry, the beacon component to receive the first beacon and the second beacon via the radio.

Example 9

The apparatus of example 8, wherein the radio comprises a Bluetooth Low Energy radio.

Example 10

The apparatus of example 8, comprising an antenna operably coupled to the radio.

Example 11

The apparatus of claim 8, comprising an antenna array operably coupled to the radio.

Example 12

The apparatus of any one of examples 1 to 7, the circuitry to comprise an application processor or a baseband processor.

Example 13

A method comprising: receiving, via a radio, a first beacon and a second beacon from a wireless device; creating a filter information element, the filter information element to include an indication to filter beacons from the wireless device and an indication of a time stamp, the time stamp corresponding to a time the first beacon was received; and updating the time stamp in the filter information element, the updated time stamp to include an indication of a time the second beacon was received.

Example 14

The method of example 13, comprising: determining whether a difference between a current time and the time stamp in the filter information element is greater than a threshold time; and removing the indication to filter beacons from the wireless device based on the determination that the difference between the current time and the time stamp in the filter information element is greater than the threshold time.

Example 15

The method of example 14, comprising adding the filter information element to a duplication filtering table.

Example 16

The method of example 15, comprising removing the filter information element from the duplication filtering table based on the determination that the difference between the current time and the time stamp in the filter information element is greater than the threshold time.

Example 17

The method of example 13, comprising: receiving a third beacon from the wireless device; and updating the time stamp in the filter information element, the updated time stamp to include an indication of a time the third beacon was received.

Example 18

The method of example 17, comprising updating the time stamp based at least in part on receiving either the second beacon or the third beacon.

Example 19

The method of example 13, comprising: communicating the first beacon to a host processing component; receiving an indication from the host processing component to filter beacons from the wireless device; and generating the filter information element based on the received indication.

Example 20

The method of any one of examples 13 to 19, wherein the radio comprises a Bluetooth Low Energy radio.

Example 21

An apparatus for a device in a wireless network, the apparatus comprising means to perform the method of any of examples 13 to 20.

Example 22

An apparatus for a wireless network comprising: a processor; a radio operably connected to the processor; one or more antennas operably connected to the radio to transmit or receive wireless signals; and a memory comprising a plurality of instructions that in response to being executed by the processor cause the processor or the radio to perform the method of any of examples 13 to 20.

Example 23

At least one machine readable medium comprising a plurality of instructions that in response to being executed by circuitry on a wireless device causes the wireless device to: receive, via a radio, a first beacon and a second beacon from a wireless broadcasting device; create a filter information element, the filter information element to include an indication to filter beacons from the wireless broadcasting device and an indication of a time stamp, the time stamp corresponding to a time the first beacon was received; and update the time stamp in the filter information element, the updated time stamp to include an indication of a time the second beacon was received.

Example 24

The at least one machine readable medium of example 23, the plurality of instruction, in response to being executed by the circuitry, further cause the wireless device to: determine whether a difference between a current time and the time stamp in the filter information element is greater than a threshold time; and remove the indication to filter beacons from the wireless broadcasting device based on the determination that the difference between the current time and the time stamp in the filter information element is greater than the threshold time.

Example 25

The at least one machine readable medium of example 24, the plurality of instruction, in response to being executed by the circuitry, further cause the wireless device to add the filter information element to a duplication filtering table.

Example 26

The at least one machine readable medium of example 25, the plurality of instruction, in response to being executed by the circuitry, further cause the wireless device to remove the filter information element from the duplication filtering table based on the determination that the difference between the current time and the time stamp in the filter information element is greater than the threshold time.

Example 27

The at least one machine readable medium of example 23, the plurality of instruction, in response to being executed by the circuitry, further cause the wireless device to: receive a third beacon from the wireless broadcasting device; and update the time stamp in the filter information element, the updated time stamp to include an indication of a time the third beacon was received.

Example 28

The at least one machine readable medium of example 27, the plurality of instruction, in response to being executed by the circuitry, further cause the wireless device to update the time stamp based at least in part on receiving either the second beacon or the third beacon.

Example 29

The at least one machine readable medium of example 23, the plurality of instruction, in response to being executed by the circuitry, further cause the wireless device to: communicate the first beacon to a host processing component; receive an indication from the host processing component to filter beacons from the wireless device; and generate the filter information element based on the received indication.

Example 30

The at least one machine readable medium of any one of examples 23 to 29, wherein the radio comprises a Bluetooth Low Energy radio.

The invention claimed is:

1. An apparatus for a wireless device, the apparatus comprising:
   circuitry;
   a beacon component executable by the circuitry, the beacon component to receive a first beacon and a second beacon from a wireless device;
   a beacon filtering component executable by the circuitry, the beacon filtering component to create a filter information element stored in a duplication filtering table, the filter information element to include an indication to filter beacons from the wireless device and an indication of a time stamp, the time stamp corresponding to a time the first beacon was received at the apparatus; and
   a beacon filter aging component executable by the circuitry, the beacon filter aging component to update the time stamp in the filter information element, the updated time stamp to include an indication of a time the second beacon was received at the apparatus.

2. The apparatus of claim 1, the beacon filter aging component to determine whether a difference between a current time and the time stamp in the filter information element is greater than a threshold time and to remove the indication to filter beacons from the wireless device based on the determination that the difference between the current time and the time stamp in the filter information element is greater than the threshold time.

3. The apparatus of claim 1, the beacon filter aging component to remove the filter information element from the duplication filtering table based on the determination that the difference between the current time and the time stamp in the filter information element is greater than the threshold time.

4. The apparatus of claim 1, the beacon component to receive a third beacon from the wireless device, the beacon filter aging component to update the time stamp in the filter information element, the updated time stamp to include an indication of a time the third beacon was received.

5. The apparatus of claim 4, the beacon filter aging component to update the time stamp based at least in part on receiving either the second beacon or the third beacon.

6. The apparatus of claim 1, comprising a host processing component, the beacon component to pass the first beacon to the host processing component and the beacon filtering component to receive an indication from the host processing component to filter beacons from the wireless device, the beacon filtering component to generate the filter information element based on the received indication.

7. The apparatus of claim 1, comprising a radio operably coupled to the circuitry, the beacon component to receive the first beacon and the second beacon via the radio.

8. The apparatus of claim 7, wherein the radio comprises a Bluetooth Low Energy radio.

9. The apparatus of claim 7, comprising an antenna operably coupled to the radio.

10. The apparatus of claim 7, comprising an antenna array operably coupled to the radio.

11. The apparatus of claim 1, the circuitry to comprise an application processor or a baseband processor.

12. A method comprising:
   receiving, via a radio, a first beacon and a second beacon from a wireless device;
   creating a filter information element stored in a duplication filtering table, the filter information element to include an indication to filter beacons from the wireless device and an indication of a time stamp, the time stamp corresponding to a time the first beacon was received at the radio; and updating the time stamp in the filter information element, the updated time stamp to include an indication of a time the second beacon was received at the radio.

13. The method of claim 12, comprising:
determining whether a difference between a current time and the time stamp in the filter information element is greater than a threshold time; and
removing the indication to filter beacons from the wireless device based on the determination that the difference between the current time and the time stamp in the filter information element is greater than the threshold time.

14. The method of claim 12, comprising removing the filter information element from the duplication filtering table based on the determination that the difference between the current time and the time stamp in the filter information element is greater than the threshold time.

15. The method of claim 12, comprising:
receiving a third beacon from the wireless device; and
updating the time stamp in the filter information element, the updated time stamp to include an indication of a time the third beacon was received.

16. The method of claim 15, comprising updating the time stamp based at least in part on receiving either the second beacon or the third beacon.

17. The method of claim 12, comprising:
communicating the first beacon to a host processing component;
receiving an indication from the host processing component to filter beacons from the wireless device; and
generating the filter information element based on the received indication.

18. The method of claim 12, wherein the radio comprises a Bluetooth Low Energy radio.

19. At least one non-transitory machine readable medium comprising a plurality of instructions that in response to being executed by circuitry on a wireless device causes the wireless device to:
receive, via a radio, a first beacon and a second beacon from a wireless broadcasting device;
create a filter information element stored in a duplication filtering table, the filter information element to include an indication to filter beacons from the wireless broadcasting device and an indication of a time stamp, the time stamp corresponding to a time the first beacon was received at the radio;
update the time stamp in the filter information element, the updated time stamp to include an indication of a time the second beacon was received at the radio;
determine whether a difference between a current time and the time stamp in the filter information element is greater than a threshold time; and
remove the indication to filter beacons from the wireless broadcasting device based on the determination that the difference between the current time and the time stamp in the filter information element is greater than the threshold time.

20. The at least one non-transitory machine readable medium of claim 19, the plurality of instruction, in response to being executed by the circuitry, further cause the wireless device to remove the filter information element from the duplication filtering table based on the determination that the difference between the current time and the time stamp in the filter information element is greater than the threshold time.

21. The at least one non-transitory machine readable medium of claim 19, the plurality of instruction, in response to being executed by the circuitry, further cause the wireless device to:
receive a third beacon from the wireless broadcasting device; and
update the time stamp in the filter information element, the updated time stamp to include an indication of a time the third beacon was received.

22. The at least one non-transitory machine readable medium of claim 19, the plurality of instruction, in response to being executed by the circuitry, further cause the wireless device to:
communicate the first beacon to a host processing component;
receive an indication from the host processing component to filter beacons from the wireless device; and
generate the filter information element based on the received indication.

* * * * *